(12) United States Patent
McColloch

(10) Patent No.: US 8,036,500 B2
(45) Date of Patent: Oct. 11, 2011

(54) MID-PLANE MOUNTED OPTICAL COMMUNICATIONS SYSTEM AND METHOD FOR PROVIDING HIGH-DENSITY MID-PLANE MOUNTING OF PARALLEL OPTICAL COMMUNICATIONS MODULES

(75) Inventor: Laurence R. McColloch, Santa Clara, CA (US)

(73) Assignee: Avago Technologies Fiber IP (Singapore) Pte. Ltd, Singapore (SG)

( * ) Notice: Subject to any disclaimer, the term of this patent is extended or adjusted under 35 U.S.C. 154(b) by 336 days.

(21) Appl. No.: 12/474,410

(22) Filed: May 29, 2009

(65) Prior Publication Data

US 2010/0303423 A1    Dec. 2, 2010

(51) Int. Cl.
*G02B 6/12* (2006.01)
*G02B 6/36* (2006.01)
*G02B 6/00* (2006.01)

(52) U.S. Cl. ............. 385/14; 385/88; 257/200; 439/564
(58) Field of Classification Search ................... 257/200; 439/564; 385/14, 16, 88–93, 147, 900, 901
See application file for complete search history.

(56) References Cited

U.S. PATENT DOCUMENTS

| | | | | |
|---|---|---|---|---|
| 6,551,134 B1 * | 4/2003 | Yunker et al. | | 439/564 |
| 6,910,809 B2 * | 6/2005 | Cheng | | 385/89 |
| 6,910,812 B2 * | 6/2005 | Pommer et al. | | 385/92 |
| 7,331,720 B1 | 2/2008 | McCollochy | | |
| 7,952,373 B2 * | 5/2011 | Mok et al. | | 324/754.14 |
| 2003/0113073 A1 * | 6/2003 | Cheng | | 385/89 |
| 2003/0201462 A1 * | 10/2003 | Pommer et al. | | 257/200 |
| 2011/0026888 A1 * | 2/2011 | Nekado et al. | | 385/92 |

OTHER PUBLICATIONS

Atsushi Suzuki, Takaaki Ishikawa, et al, 10-Gb/s x 12-ch Downsized Optical Modules with Electrical Conductive Film Connector, IEEE Electronic Comp., 2008, pp. 250-255, IEEE.

Takaaki Ishikawa, Atsushi Suzuki, et al, High-density and Low-cost 10-Gbps x 12ch Optical Modules for High-end Optical Interconnect Applications, OFC/NFOEC, 2008, IEEE.

OptoCube™ 40 Transmitter & Receiver, Emcore Product Brief, Dec. 2004, Emcore Corporation, Albuquerque, New Mexico.

* cited by examiner

*Primary Examiner* — Akm Ullah

(57) ABSTRACT

An optical communications system and method are provided in which multiple parallel optical communications modules are mid-plane mounted on a PCB motherboard. Each module is connected to an optical fiber ribbon cable. The modules are configured to have very low profiles and/or to provide an angular coupling of the ribbon cable to the module. In both cases, the module configurations obviate the need to leave a significant amount of space between a module and the one behind it for the purpose of providing room for the ribbon cable to exit the module without the cable being bent beyond its minimum bend radius. This feature allows the module mounting density on the motherboard PCB to be very high and allows the modules to be mounted closer to their respective hub ICs, which increases mounting density and allows the modules to be mounted closer to their respective hub ICs.

20 Claims, 11 Drawing Sheets

MID-PLANE MOUNTED OPTICAL COMMUNICATIONS SYSTEM AND METHOD FOR PROVIDING HIGH-DENSITY MID-PLANE MOUNTING OF PARALLEL OPTICAL COMMUNICATIONS MODULES

TECHNICAL FIELD OF THE INVENTION

The invention relates to optical communications systems. More particularly, the invention relates to an optical communications system and method for high-density, mid-plane mounting of multiple parallel optical communications modules.

BACKGROUND OF THE INVENTION

A parallel optical communications module is a module having multiple transmit (TX) channels, multiple receive (RX) channels, or both. A parallel optical transceiver module is an optical communications module that has multiple TX channels and multiple RX channels in the TX and RX portions, respectively, of the transceiver. The TX portion comprises components for transmitting data in the form of modulated optical signals over multiple optical waveguides, which are typically optical fibers. The TX portion includes a laser driver circuit and a plurality of laser diodes. The laser driver circuit outputs electrical signals to the laser diodes to modulate them. When the laser diodes are modulated, they output optical signals that have power levels corresponding to logic 1s and logic 0s. An optics system of the transceiver module focuses the optical signals produced by the laser diodes into the ends of respective transmit optical fibers held within a connector that mates with the transceiver module.

Typically, the TX portion also includes a plurality of monitor photodiodes that monitor the output power levels of the respective laser diodes and produce respective electrical feedback signals that are fed back to the transceiver controller. The transceiver controller processes the feedback signal to obtain respective average output power levels for the respective laser diodes. The transceiver controller outputs control signals to the laser driver circuit that cause it to adjust the modulation and/or bias current signals output to the respective laser diodes such that the average output power levels of the laser diodes are maintained at relatively constant levels.

The RX portion includes a plurality of receive photodiodes that receive incoming optical signals output from the ends of respective receive optical fibers held in the connector. The optics system of the transceiver module focuses the light that is output from the ends of the receive optical fibers onto the respective receive photodiodes. The receive photodiodes convert the incoming optical signals into electrical analog signals. An electrical detection circuit, such as a transimpedance amplifier (TIA), receives the electrical signals produced by the receive photodiodes and outputs corresponding amplified electrical signals, which are processed in the RX portion to recover the data.

There is an ever-increasing demand in the optical communications industry for optical communications systems that are capable of simultaneously transmitting and receiving ever-increasing amounts of data. To accomplish this, it is known to combine multiple parallel optical transceiver modules of the type described above to produce an optical communications system that has a higher bandwidth. A variety of parallel transceiver modules are used in the optical communications industry for this purpose. For example, one known transceiver module of the type described above includes a multi-fiber connector module known in the industry as the MTP® connector module. The MTP connector module plugs into a receptacle of a transceiver module that is secured to a front panel of the optical communications system. The MTP connector module receives a duplex fiber ribbon cable having a total of 4, 8, 12, 24, or 48 optical fibers. Typically, half of the fibers of the ribbon cable are transmit fibers and the other half are receive fibers, although all of the fibers may be either transmit or receive fibers in cases where the module is being used as either a transmitter or a receiver, but not both. When the MTP connector module is plugged into the receptacle, electrical contacts of the connector module are electrically connected with electrical contacts of a printed circuit board (PCB) of the transceiver module. The laser diodes and the photodiodes are integrated circuits (ICs) that are mounted on the PCB. A laser driver IC and a transceiver controller IC are typically also mounted on the PCB, although the transceiver controller IC is sometimes mounted on a separate IC, known as the motherboard IC of the optical communications system.

It is known that multiple transceiver modules of the type that use the MTP connector can be arranged in an array to provide an optical communications system that has an overall bandwidth that is generally equal to the sum of the bandwidths of the individual transceiver modules. One of the problems associated with such an array is that because the MTP connectors are edge-mounted in receptacles formed in the front panel of the optical communications system, there are limitations on the ability of such an array to achieve very large increases in bandwidth. For example, in order to obtain an optical communications system that has the ability to simultaneously transmit and receive one terabit of data per second (Tb/s), the racks and cabling needed to accommodate the transceiver modules would consume so much space that the solution would be impractical in many cases. In addition, an array of this type would present heat dissipation problems, and in most cases, would be prohibitively expensive.

An alternative to edge-mounting parallel optical transceiver modules is to mid-plane mount parallel optical transceiver modules. A mid-plane mounting configuration is one in which the modules are mounted in the plane of the motherboard PCB. One known parallel optical transceiver module that is mid-plane mounted is the Snap 12 transceiver module. The Snap 12 transceiver module comprises a 12-channel TX module and a 12-channel RX module. Each module has an array of 100 input/output (I/O) pins that plugs into a 100-pin ball grid array (BGA), known as a Meg-array. The Meg-array is, in turn, secured to the host PCB motherboard. The Snap 12 transceiver system has a bandwidth of 10 Gigabits (Gbs) per channel, and has a total bandwidth of 120 Gb/s.

The Snap 12 system is typically mounted in a box, which is connected to multiple electrical cables, which, in turn, are connected to multiple router ICs. In order to increase the total bandwidth of an optical communications system that uses multiple mid-plane mounted Snap 12 transceiver modules, multiple boxes may be used. The boxes are typically mounted in racks. For example, to obtain a system having a total bandwidth of ½ Tb/s, a total of five Snap 12 boxes would be needed. The racks needed to accommodate this many boxes and the cables needed to interconnect the boxes to the router ICs consume a large amount of space and generate a large amount of heat. The space consumption and heat generation problems must be dealt with in order to make the system operate properly.

In addition, the Snap 12 transmit and receive modules are relatively tall (approximately 15 mm in height), which often results in the occurrence of relatively large impedance disturbances in the modules. These impedance disturbances reduce signal integrity and therefore limit the bandwidth efficiency of the system. Also, each Snap 12 box is sold as a stand-alone part that is relatively expensive. Consequently, a system that is constructed of multiple boxes in order to achieve an increased bandwidth is generally very expensive.

Other mid-plane mounting solutions exist or have been proposed for mounting multiple parallel optical transceiver modules on a motherboard PCB. One of the problems associated with the existing or proposed mid-plane mounting solutions is that there are limitations on the mounting density of the modules on the motherboard PCB. One of the reasons for this is that the optical fiber ribbon cables that connect to the modules typically pass out of the side of the module that faces the front panel, which makes it necessary to provide some space between each module and the module behind it to avoid having to bend the ribbon cable of the module in front by a large amount to allow it to pass over the module in back of it. Consequently, the number of modules that can be mounted on the motherboard is limited by the additional space needed between adjacent modules to accommodate the cables.

In addition, with known edge-mounting and mid-plane mounting configurations, the electrical conductors that electrically connect the circuitry of the modules to their respective hub ICs on the motherboard PCB have to be relatively long. This is especially true with edge-mounted modules where the electrical conductors have to extend over a distance between the front panel where the modules are mounted and the hub IC. However, this is also true with mid-plane mounting configurations where the lengths of the conductors are increased due to the additional space that is needed between one module and the one behind it to accommodate the ribbon cable passing out of the side of the front module. Because these modules often operate at the limits of the latest high-speed electronics, the long conductor lengths tend to create signal integrity problems.

Accordingly, a need exists for an optical communications system having a mid-plane mounting configuration in which parallel optical transceiver modules are capable of being mounted with very high density on the motherboard PCB. Increasing the mounting density of the modules increases the amount of data that can be simultaneously transmitted from and received in the optical communications system. In addition, the high density of the modules on the motherboard enables the lengths of the conductors that connect the electrical circuitry of the modules to their respective hub ICs to be reduced, which helps prevent signal integrity problems.

SUMMARY OF THE INVENTION

The invention is directed to an optical communications system and method. The system comprises a motherboard, at least two Meg-Array connector assemblies, and at least first and second parallel optical communications modules (POCMs). The motherboard comprises a substrate having an upper surface and a lower surface. The upper surface has at least two arrays of electrical contact pads disposed thereon, and the substrate has electrical conductors extending through it. The Meg-Array connector assemblies each comprise a Meg-Array receptacle and a Meg-Array plug that are mechanically and electrically coupled together. The lower and upper surfaces of the receptacle and the plug, respectively, having respective ball grid array (BGAs) thereon. The Meg-Array connector assemblies are mounted on the upper surface of the motherboard such that the arrays of electrical contact pads on the upper surface of the motherboard are in electrical contact with the respective BGAs on the lower surfaces of the respective receptacles. The first and second POCMs each have at least a front side, a back side, a bottom side, and a top side. The POCMs are mounted on the upper surfaces of respective ones of the Meg-Array plugs such that the back side of the first POCM is in contact with or in close proximity to the front side of the second POCM with a spacing distance, $D_S$, between the back side and front side of the first and second POCMs, respectively. The spacing distance $D_S$ is equal to or greater than 0 millimeters (mm) and less than or equal to about 15 mm. Each POCM is connected to a proximal end of a respective optical fiber ribbon cable in such a way that the respective cables exit the respective POCMs at the respective back sides of the respective POCMs.

The method comprises providing a motherboard and providing X Meg-Array plugs having X parallel optical communications modules (POCMs) mounted thereon, respectively, where X is a positive integer that is equal to or greater than 2. The upper surface has at least X arrays of electrical contact pads disposed thereon, and at least first and second hub ICs mounted thereon. The hub ICs are electrically connected to one or more of the electrical conductors that extend through the motherboard substrate. The upper surface of the motherboard has X Meg-Array receptacles mounted thereon, each of which has a BGA thereon that is in electrical contact with a respective one of the arrays of electrical contact pads disposed on the upper surface of the motherboard. Each POCM has at least a front side, a back side, a bottom side, and a top side. The POCMs and the respective plugs on which the POCMs are mounted are arranged on the upper surface of the motherboard in groups with each group comprising at least a front POCM and a back POCM. The back side of the front POCM of each respective group is in contact with or in close proximity to the front side of the back POCM of the same respective group such that the back side of the front POCM of each respective group is spaced a spacing distance, $D_S$, from the front side of the back POCM of the same respective group. The spacing distance $D_S$ is equal to or greater than 0 mm and less than or equal to about 15 mm. Each POCM is connected to a proximal end of a respective optical fiber ribbon cable in such a way that the respective cables exit the respective POCMs from the back sides of the respective POCMs.

These and other features and advantages of the invention will become apparent from the following description, drawings and claims.

DETAILED DESCRIPTION OF AN ILLUSTRATIVE EMBODIMENT

Figure 1:
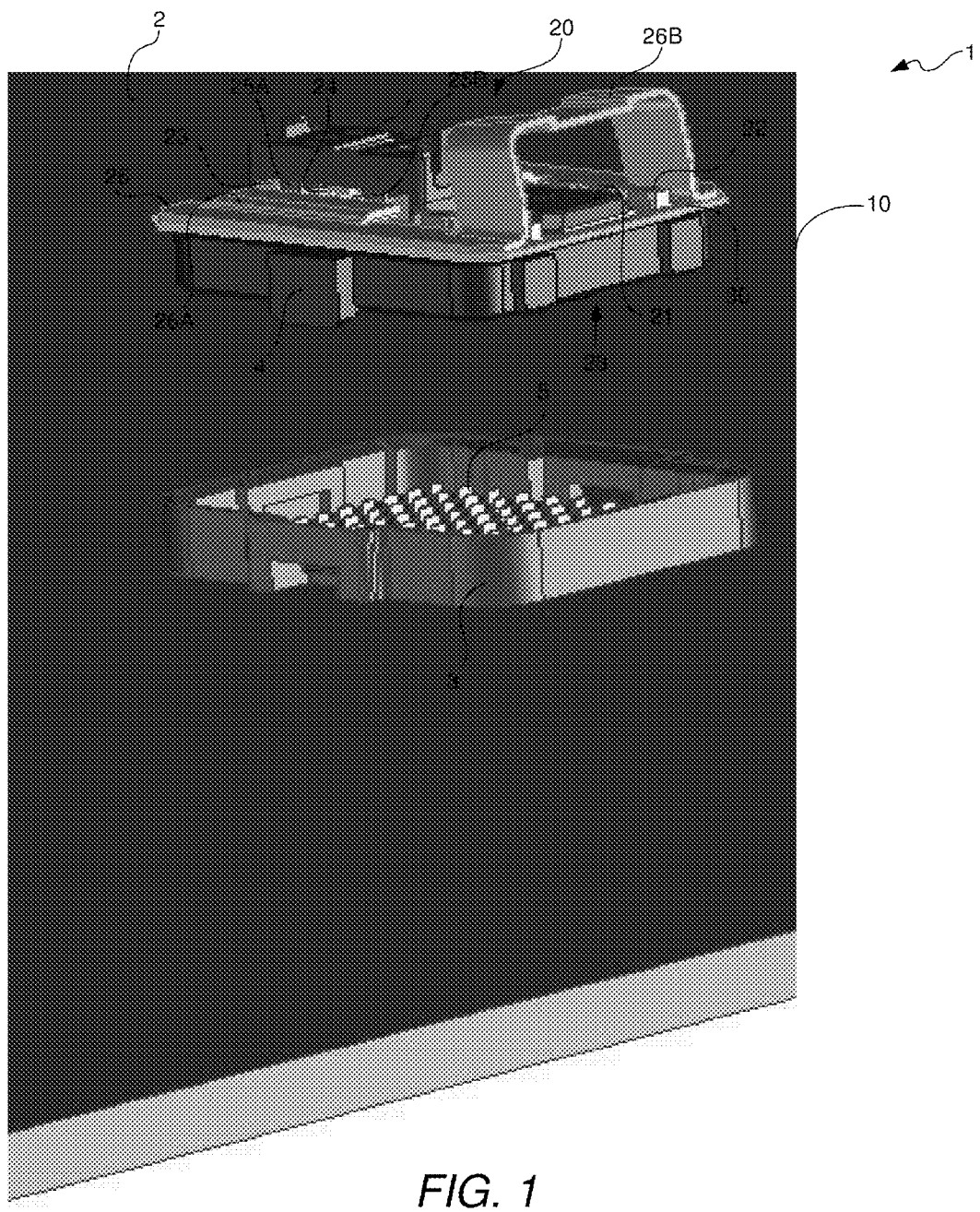
FIG. 1 illustrates a top perspective view of the optical communications system in accordance with an embodiment comprising a motherboard PCB, a Meg-Array receptacle that is mid-plane mounted on the upper surface of the motherboard PCB, a Meg-Array plug, and a parallel optical communications module mounted on an upper surface of the plug.

In accordance with the invention, an optical communications system is provided comprising multiple parallel optical communications modules that are mid-plane mounted on a PCB motherboard of the type that is sometimes referred to as a card or a blade. Each module is connected to an optical fiber ribbon cable. The modules are configured to have very low profiles and/or to provide an angular coupling of the ribbon cable to the module. In both cases, the module configurations enable the modules to be mounted on the motherboard PCB with very little or no space between adjacent modules because the need for space for the ribbon cables to exit the modules is eliminated or lessened. This feature allows the module mounting density on the motherboard PCB to be very high and allows the modules to be mounted closer to their respective hub ICs. The higher mounting density increases the overall bandwidth of the system, whereas mounting the modules closer to their respective ICs allows the lengths of the electrically conductive signal pathways between the modules and their respective hub ICs to be reduced, which improves signal integrity.

In accordance with one embodiment, each optical fiber ribbon cable connects to its respective module at an angle to the plane of the surface of the motherboard PCB on which the modules are mounted. This angle, which is referred to herein as the departure angle, is typically between about 5° and about 30°. Because of the departure angle, the cables clear the tops of the modules behind them without having to be bent so that no space is needed between adjacent the modules to accommodate the cables. Consequently, the modules can me mounted in abutment with one another to maximize the mounting density of the modules on the motherboard PCB. In accordance with another embodiment, the modules have very low profiles that they can be mounted with very little space between them while still allowing the ribbon cables to pass over adjacent modules without having to bend the cables beyond their minimum bending radiuses.

In addition, each optical communications module is approximately the same size in the width, W, and length, L, dimensions as the known Meg-Array® connector assembly, which is manufactured by a company called FCI, of Versailles, France. The reason for making the optical communications modules the same size in the W×L dimensions as the Meg-Array connector assembly is to enable the modules to be used with the Meg-Array assemblies without having to mount the assemblies with additional space between them on the motherboard PCB. This feature further improves the mounting density of the optical communications modules on the motherboard PCB.

The Meg-Array connector assembly includes a receptacle and a plug. The lower surface of the Meg-Array receptacle has a BGA thereon that is designed to electrically connect to an array of electrical contact pads formed on the upper surface of a PCB. Similarly, the upper surface of the Meg-Array plug has a BGA thereon that is designed to electrically connect to an array of electrical contact pads formed on the upper surface of another PCB. The upper and lower surfaces of the Meg-Array receptacle and plug, respectively, have respective arrays of copper fingers thereon that interconnect with each other when the Meg-Array plug is plugged into the Meg-Array receptacle, thereby electrical connecting the BGA on the lower surface of the Meg-Array receptacle with the BGA on the upper surface of the Meg-Array plug via the connections between the arrays of copper fingers on the Meg-Array receptacle and plug. The electrical connections between the BGAs of the plug and receptacle result in electrical connections being made between the PCBs mounting on the plug and on the receptacle.

FIG. 1 illustrates a top perspective view of the optical communications system 1 in accordance with an embodiment comprising a motherboard PCB 10, a Meg-Array receptacle 3 that is mid-plane mounted on an upper surface 2 of the motherboard PCB 10, a Meg-Array plug 4, and a parallel optical communications module 20 mounted on an upper surface of the plug 4. For ease of illustration, a single parallel optical communications module 20 is shown in FIG. 1. However, as will be described below in detail with reference to FIG. 3, the optical communications system 1 has a plurality of the modules 20 mounted on respective Meg-Array connector assemblies 3, 4 that are mounted on the upper surface of the motherboard PCB 10 in close proximity to one another.

The perspective view of FIG. 1 shows the Meg-Array plug 4 with the parallel optical communications module 20 mounted thereon as the Meg-Array plug 4 is about to be plugged into the Meg-Array receptacle 3. The parallel optical communications module 20 includes a module PCB 30 on which a controller IC 21, passive electrical components 22, and a leadframe 23 are mounted. An array of laser diodes 24 and two laser driver ICs 25A and 25B are mounted on the leadframe 23, as will be described below in more detail. A heat sink coupling device 26 is secured to the module PCB 30 and includes a heat coupling portion 26A and a ribbon cable support portion 26B. The heat coupling portion 26A is in contact with the leadframe 23 such that heat that is transferred from the laser driver ICs 25A and 25B and from the array of laser diodes 24 into the leadframe 23 is thermally coupled into the heat sink coupling device 26. The heat sink coupling device 26 is configured to mechanically couple with a customer heat sink device (not shown) to dissipate heat away from the module 20.

The lower surface of the module PCB 30 has an array of electrically conductive contact pads (not shown) disposed thereon that is in contact with the BGA (not shown) disposed on the upper surface of the Meg-Array plug 4. Similarly, the motherboard PCB 10 has an array of electrically conductive contact pads disposed thereon that is in contact with the BGA (not shown) located on the lower surface of the Meg-Array receptacle 3. As indicated above, the receptacle 3 and the plug 4 each have an array of copper fingers 5 on the surface opposite the respective BGAs. When the plug 4 is plugged into the receptacle 3, these arrays of copper fingers 5 interconnect, thereby providing an electrically conductive pathway between the arrays of contact pads disposed on the upper surface of the motherboard PCB 10 and on the lower surface of the module PCB 30. In this way, the ICs 21, 24, 25A and 25B of the module 20 are in communication with the electrical circuitry (not shown) mounted on the motherboard PCB 10, as will be described below in more detail.

Figure 2:
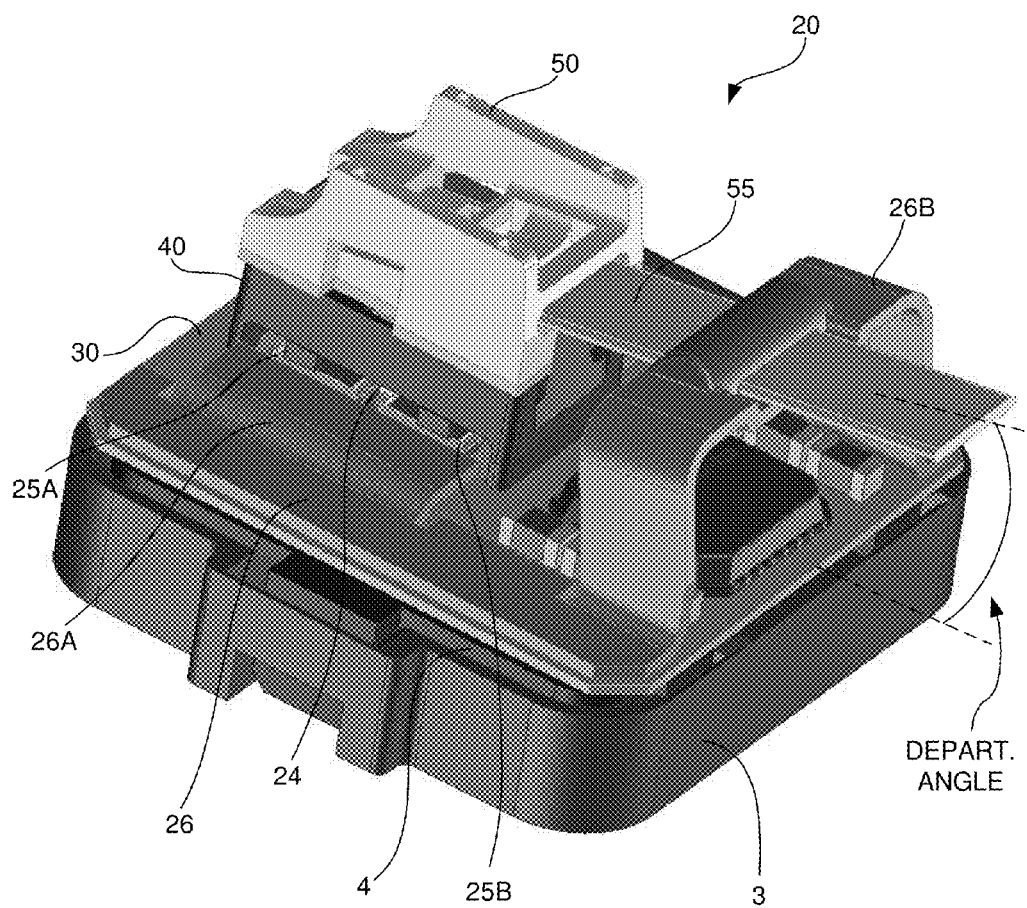
FIG. 2 illustrates a perspective top view of the parallel optical communications module shown in FIG. 1 after a connector module having an end of an optical fiber ribbon cable secured thereto has been connected to an optics system of the parallel optical communications module.

FIG. 2 illustrates a perspective top view of the parallel optical communications module 20 shown in FIG. 1 after a connector module 50 having an end of an optical fiber ribbon cable 55 secured thereto has been connected to an optics system 40 of the parallel optical communications module 20. The optics system 40 optically couples light produced by the laser diodes of the array 24 onto the ends of respective optical fibers (not shown) of the optical fiber ribbon cable 55. The optical fiber ribbon cable 55 is supported on the ribbon cable support portion 26B of the heat sink coupling device 26. Although the connector module 50 includes a strain relief device (not shown) for relieving mechanical strain on the ribbon cable 55, the ribbon cable support portion 26B also provides strain relief for the ribbon cable 55.

The distance, D1, from the ribbon cable support portion 26B to the upper surface of the module PCB 30 is greater than the distance, D2, from the location where the connector module 50 connects to the optics system 40 to the upper surface of the module PCB 30. This difference, D1–D2, between these two locations along the ribbon cable creates an angle between the upper surface of the module PCB 30 and the ribbon cable at the location where the cable passes over the back edge 28 of the module 20. This angle, referred to herein as the "departure angle", typically ranges from between about 5° and about 30°. Because of the departure angle, the ribbon cable that attaches to each module 20 passes over the top of an identical one of the modules 20 mounted behind it on the motherboard PCB 10 and its respective ribbon cable 55. Consequently, the modules 20 can be mounted one behind the other on the motherboard PCB 10 without having to leave space between the modules 20 to accommodate the ribbon cables. In other words, the modules 20 can be mounted on the motherboard IC 30 such that they are in abutment with one another, which allows mounting density on the motherboard PCB 10 to be increased over that which is currently possible using known mid-plane mounting solutions. This high mounting density capability enables the overall bandwidth of the optical communications system 1 to be increased over that which is currently possible using known mid-plane mounting solutions.

Another advantage of using the Meg-Array connector assembly 3, 4 for this purpose is that any one of the parallel optical communications modules 20 can be swapped out, i.e., replaced, by simply unplugging the Meg-Array plug 4 from its respective Meg-Array receptacle 3 and plugging a different Meg-Array plug (not shown) having a different optical communications module (not shown) thereon into the Meg-Array receptacle 3. This is in contrast to some known mid-plane mounting optical communications systems in which the modules are fixedly secured to the motherboard PCB, e.g., by epoxy, in which cases the modules cannot be easily replaced or reworked.

Another advantage of using the Meg-Array connector assembly 3, 4 is realized by making the modules have approximately the same W×L dimensions as the Meg-Array connector assembly 3, 4. This feature in combination with the departure angle of the ribbon cables 55 also facilitates mounting the modules 20 on the motherboard PCB 10 in abutment with, or in very close proximity to, one another on the motherboard PCB 10, which also helps to increase the overall bandwidth of the optical communications system 1.

In accordance with the illustrative embodiment shown in FIG. 2, the parallel optical communications module 20 is a parallel optical TX having twelve TX channels. The laser diode array 24 is a 1×12 array having twelve laser diodes. The optical ribbon cable 55 has twelve optical fibers for carrying the optical signals produced by respective ones of the laser diodes of the array 24. The laser driver IC 25A generates six electrical drive signals that drive six respective laser diodes of the laser diode array 24. The laser driver IC 25B generates six electrical drive signals that drive the other six respective laser diodes of the laser diode array 24. As an alternative, the laser diode array 24 and the laser driver ICs 25A and 25B could be replaced with twelve receive photodiodes and a receiver IC, respectively, in which case the parallel optical communications module 20 would be a parallel optical RX module having twelve RX channels. In the latter case, the all twelve fibers of the ribbon cable 55 would be used for receiving optical data signals in the module 20. As another alternative, the module 20 could have six laser diodes, six receive photodiodes, one laser driver IC 25A and a receiver IC, in which case the module 20 would be a parallel optical transceiver module having six TX channels and six RX channels. In the latter case, six fibers of the ribbon cable 55 would be used for receiving optical data signals and six fibers of the cable 55 would be used for transmitting optical data signals. It should be noted, however, that the invention is not limited to having a particular number of TX and/or RX channels and associated electrical and optical components. For ease of discussion, the term "parallel optical communication module", as that term is used herein, refers to modules that have only TX channels, modules that have only RX channels, and modules that have both RX and TX channels.

Figure 3:
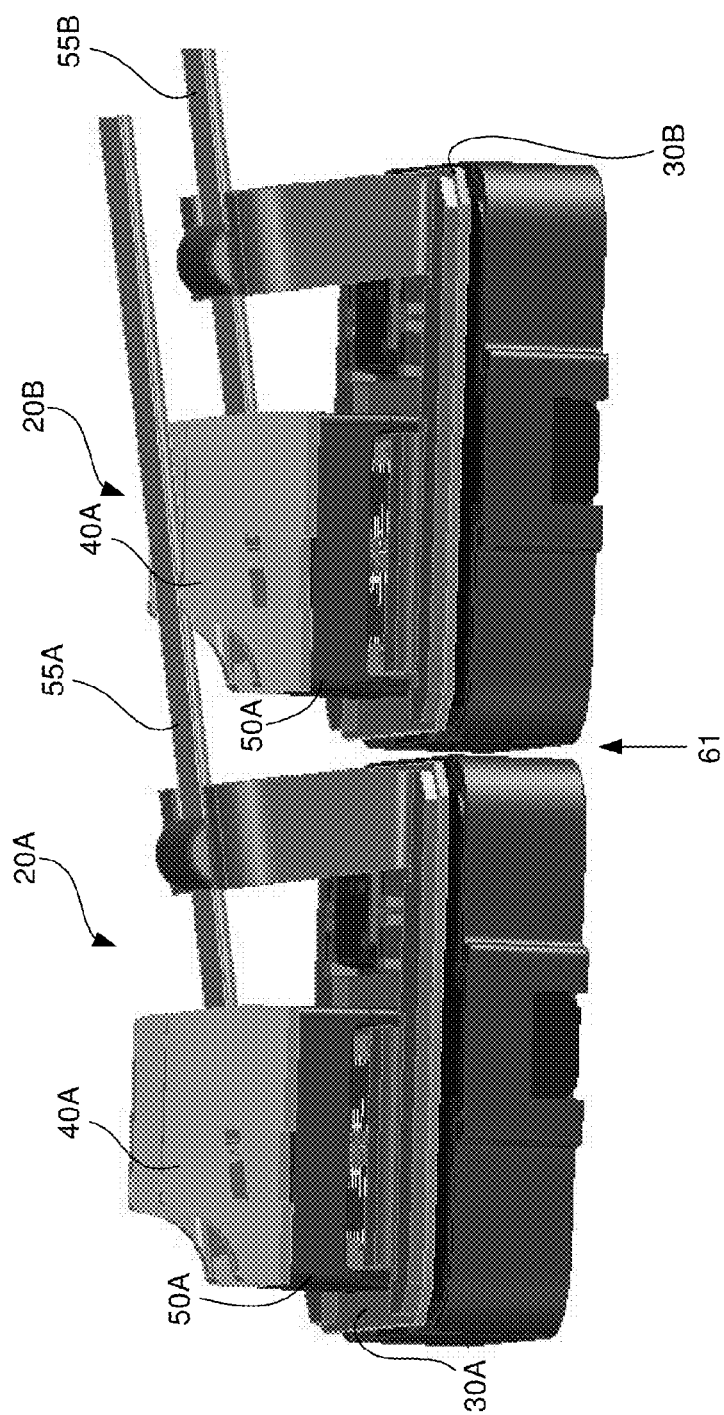
FIG. 3 illustrates a side perspective view of two of the parallel optical communications modules shown in FIG. 2 as they would be arranged on the upper surface of the motherboard PCB.

FIG. 3 illustrates a side perspective view of two of the parallel optical communications modules 20 shown in FIG. 2, which are labeled 20A and 20B. The modules 20A and 20B are shown arranged as they would be on a motherboard PCB 10 shown in FIG. 1. The motherboard PCB 10 shown in FIG. 1 is not shown in FIG. 3 for ease of illustration. From the side perspective view shown in FIG. 3, the manner in which the departure angles of the respective fiber ribbon cables enable the fiber ribbon cable 55A connected to the module 20A in front to pass over the module 20A in back and its respective ribbon cable 55B. In this way, the spacing 61 between the module 20A in front and module 20B in back can be minimized or eliminated, thereby allowing the density with which the modules 20 (FIG. 1) are mounted on the motherboard PCB 10 (FIG. 1) to be greatly increased over that which is possible using known edge-mounting solutions.

Figure 4:
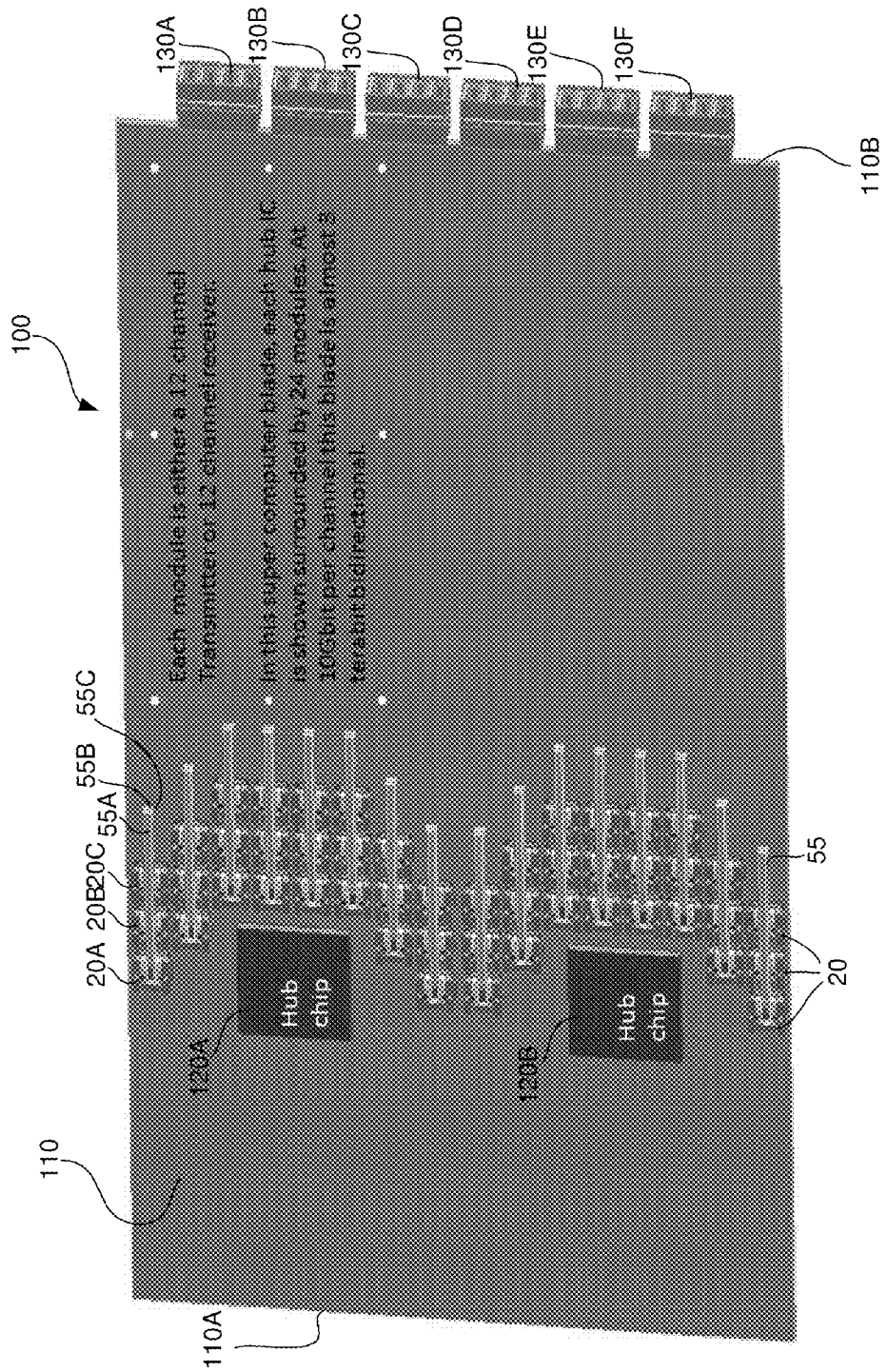
FIG. 4 illustrates a perspective top view of the optical communications system in accordance with an embodiment in which forty-eight of the parallel optical communications modules shown in FIG. 2 and two hub ICs are mounted on the upper surface of a motherboard PCB.

FIG. 4 illustrates a perspective top view of the optical communications system 100 in accordance with an embodiment in which forty-eight of the parallel optical communications modules 20 and two hub ICs 120A and 120B are mounted on an upper surface of a motherboard PCB 110. The motherboard PCB 110 may be, for example, a super computer blade. In accordance with this embodiment, each of the modules 20 is either a twelve-channel optical TX or a twelve-channel optical RX. Each channel transmits or receives at 10 Gb/s. Assuming for exemplary purposes that twenty-four of the modules 20 are TX modules having twelve TX channels each and that twenty-four of the modules 20 are RX modules having twelve RX channels each, then the system 1 is capable of simultaneously transmitting and receiving about 3 terabits/s (Tb/s) of data. Twenty-four of the modules 20 are arranged around the first hub IC 120A and twenty-four of the modules 20 are arranged around the second hub IC 120B. The arrangement of the modules 20 around their respective hub ICs 120A and 120B enables the lengths of the electrical conductors that connect the modules 20 to the hub ICs 120A and 120B to be kept very short, which helps to ensure good signal integrity.

For demonstrative purposes, three of the modules 20 are labeled 20A, 20B and 20C in FIG. 4, and their corresponding ribbon cables 55 are labeled 55A, 55B, and 55C, respectively. It can be seen from FIG. 4 that the modules 20 are arranged in columns in groups of three. In each group, there is a front module, a back module, and a middle module. For example, for the group that includes modules 20A, 20B and 20C, the front module 20A is the closest of the three modules to the front end 110A of the motherboard PCB 110. The back module 20C is closest of the three modules 20A-20C to the back end 110B of the motherboard PCB 110. The module 20B is in between module 20A and module 20C. The optical fiber ribbon cable 55A of the front module 20A passes over the top of the middle and back modules 20B and 20C, respectively, of the group and their respective ribbon cables 55B and 55C. The optical fiber ribbon cable 55B of the middle module 20A passes over the top of the back modules 20C of the group and its respective ribbon cable 55C.

The proximal ends of the ribbon cables 55A, 55B and 55C are secured by their respective connectors (not shown) to the modules 20A, 20B and 20C, respectively. The distal ends of the ribbon cables 55A, 55B and 55C are secured to connectors (not shown) that are connected to receptacles 130A, 130B and 130C secured to the back end 110B of the motherboard PCB 110. There are a total of six groups of receptacles 130A-130F secured to the back end 110B of the motherboard PCB 110 for receiving connectors (not shown) that terminate the distal ends of respective ones of the ribbon cables 55.

As described above with reference to FIGS. 2 and 3, because of the departure angles of the ribbon cables 55, the ribbon cable 55 of one of the module 20 that is in front of one or more other ones of the modules 20 passes over the tops of the modules 20 behind it and their respective ribbon cables 55. This feature allows the modules 20 to mounted in abutment or in very close proximity to one another on the motherboard PCB 110. This feature also helps to reduce the lengths of the electrical conductors that extend in the motherboard PCB 110 between the modules 20 and their respective hub ICs 120A and 120B. Reducing the lengths of these conductors helps to ensure good signal integrity. In addition, the ability to mount the modules 20 on the motherboard PCB 110 in abutment or in very close proximity to one another enables the length of the motherboard PCB 110 from the front end 110A of the PCB 110 to the back end 110B of the PCB 110 to be reduced. This feature allows the overall size of the optical communications system 100 to be reduced.

Figure 5:
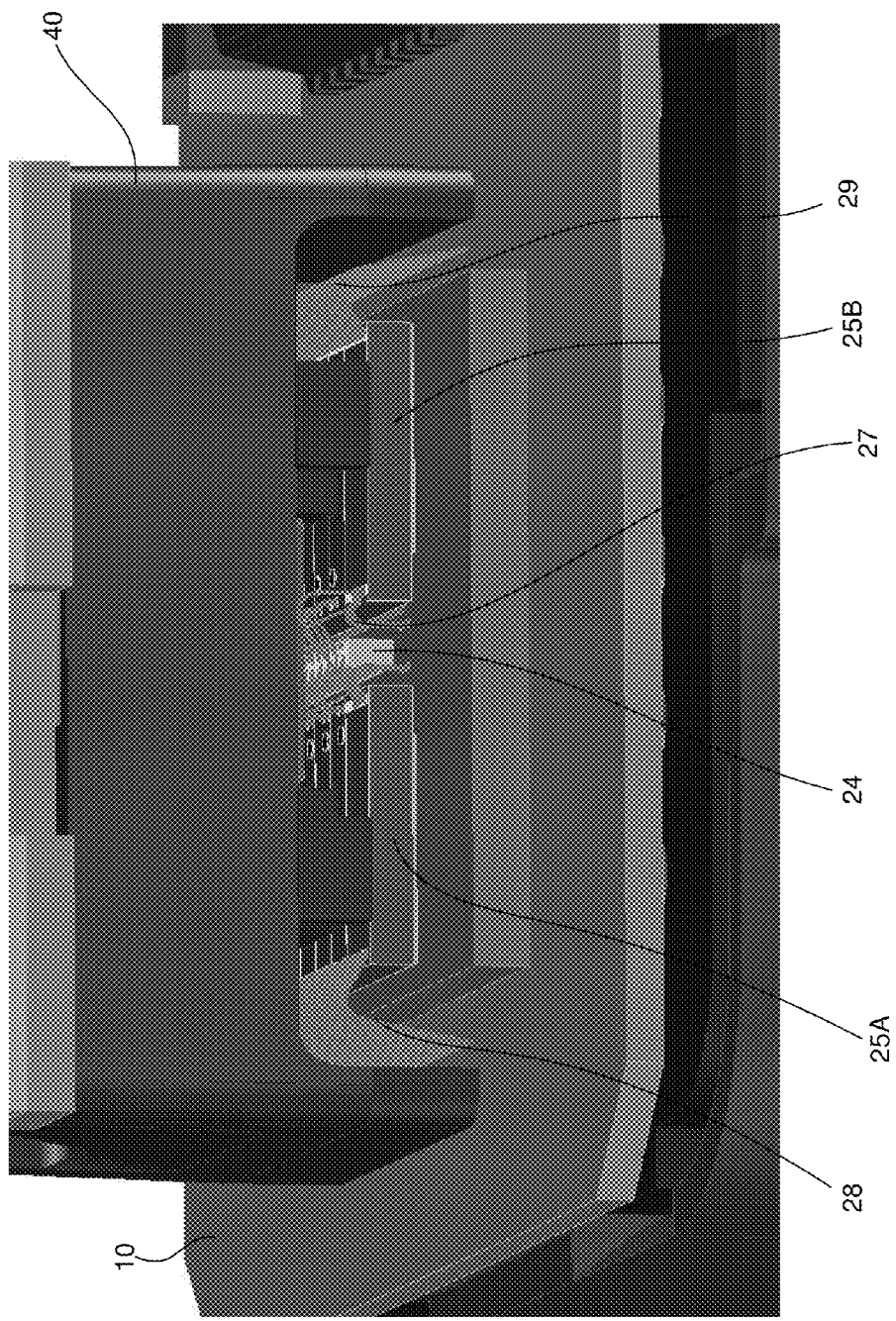
FIG. 5 illustrates a cross-sectional side view of a portion of the parallel optical transceiver module shown in FIG. 2, which has been enlarged to enable the laser diode array and the laser driver ICs to be more easily seen.

FIG. 5 illustrates a cross-sectional side view of a portion of the parallel optical transceiver module 20 shown in FIG. 2, which has been enlarged to enable the laser diode array 24 and the laser driver ICs 25A and 25B to be more easily seen. The laser driver ICs 25A and 25B and the laser diode array 24 are arranged in a balanced laser driver arrangement in which the laser driver IC 25A is located on one side of the laser diode array 24 and the laser driver IC 25B is located on the other side of the laser diode array 24 opposite the laser driver IC 25A. Bond wires 27 electrically couple the laser diode array 24 to the laser driver ICs 25A and 25B. Bond wires 28 electrically couple the laser driver IC 25A to the module PCB 10. Bond wires 29 electrically couple the laser driver IC 25B to the module PCB 10. The balanced arrangement allows the wire bonds 27 and the high speed signal pathways in the ICs 25A and 25B to be reduced in length, which helps ensure good signal integrity.

The invention is not limited to the parallel optical communications modules having any particular configurations. While the configurations described above with reference to FIGS. 1-5 are desirable, other module configurations are also possible.

Figure 6:
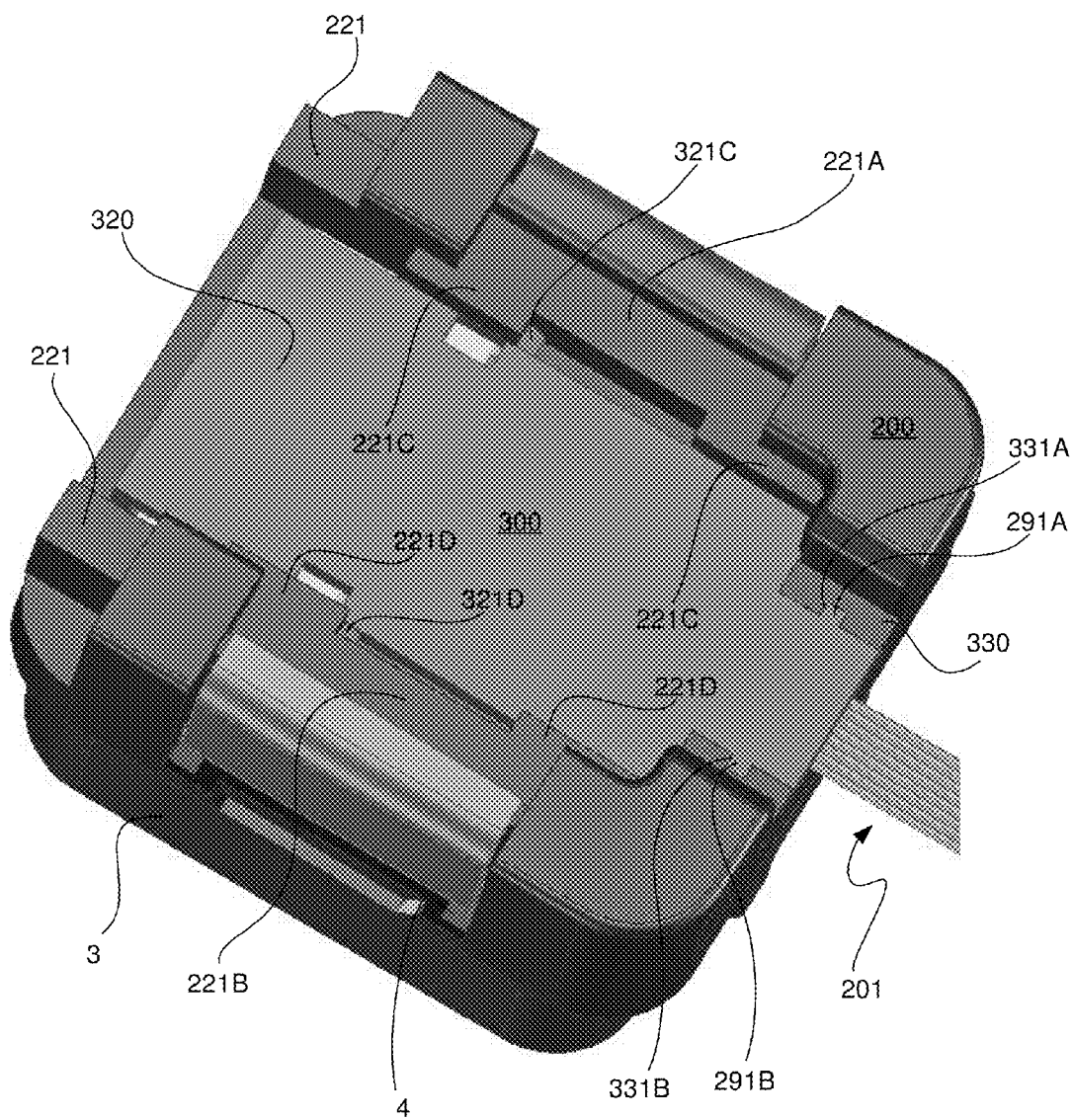
FIG. 6 illustrates a top perspective view of a parallel optical transceiver module coupled in locking engagement with a connector module in accordance with another embodiment.

FIG. 6 illustrates a top perspective view of an optical transceiver module 200 coupled in locking engagement with a connector module 300. The optical transceiver module 200 is a parallel optical transceiver module having either multiple TX channels, multiple RX channels, or multiple TX and multiple RX channels. Like the parallel optical transceiver module 20 described above with reference to FIGS. 1-5, the parallel optical transceiver module 200 shown in FIG. 6 uses a Meg-Array connector assembly 3, 4. The connector module 300 holds the ends of a plurality of optical fibers of an optical fiber ribbon cable 201 and secures them in a way that provides strain relief from forces exerted on the fibers and optically aligns the ends of the fibers with an optics system (not shown) within the connector module 300, as will be described below with reference to FIGS. 7 and 8A-8D.

The sliding-lock mechanism 221 includes a pair of side sliding members 221A and 221B that place a downward force on the connector module 300 that presses down on the connector module 300 and holds it in place in locking engagement with the transceiver module 200. Each of the side sliding members 221A and 221B has a pair of outwardly projecting tabs 221C and 221D, respectively, which engage a pair of outwardly projecting tabs 321C and 321D, respectively, on the connector module housing 320. A strain relief device 330 configured to tightly grip the optical fiber ribbon cable 201 snaps onto the housing of the connector module 300 via a keying arrangement in which connecting devices 291A and 291B formed in the housing of the connector module 300 are received in respective slots 331A and 331B formed in the strain relief device 330. One of the advantages of the sliding-lock mechanism 221 is that it allows the connector module 300 to be unlocked from the transceiver module 200 and removed. This feature allows the connector module 300 to be reworked or replaced without having to disconnect the Meg-Array plug 4 from the Meg-Array receptacle 3. Like the module 20 shown in FIG. 2, the entire module including the combination of the transceiver module 200 and the connector module 300 can be removed by disconnecting the Meg-Array plug 4 from the Meg-Array receptacle 3 to allow the modules 200 and/or 300 to be reworked or replaced.

It should be noted that although the optical communications systems described above with respect to the illustrative embodiments use the known Meg-Array connector assembly, the invention is not limited to using this particular assembly. Other similar, or Meg-Array-type, connector assemblies that have similar constructions as that of the FCI Meg-Array connector assembly may be used for this purpose. Thus, the terms "Meg-Array connector assembly", "Meg-Array receptacle" and "Meg-Array plug", as those terms are used herein, are meant to include the FCI Meg-Array assembly, receptacle and plug, respectively, as well as any other assembly, receptacle and plug, respectively, that have similar constructions.

Figure 7:
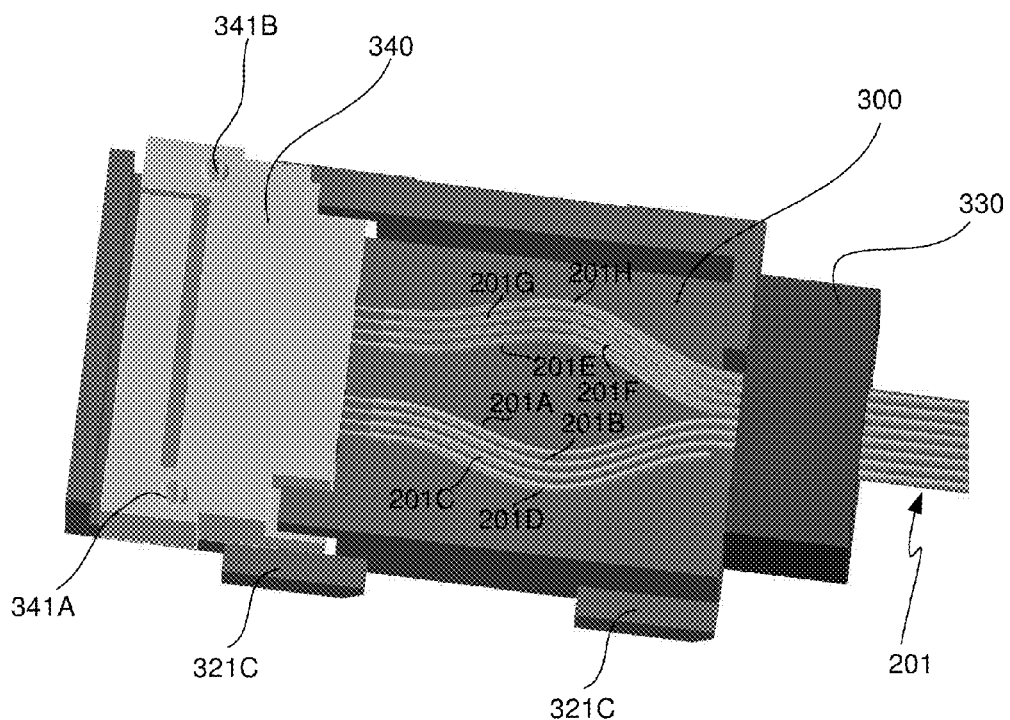
FIG. 7 illustrates a bottom perspective view of the connector module shown in FIG. 6.

FIG. 7 illustrates a bottom perspective view of the connector module 300 shown in FIG. 6. The transceiver module 200 (FIG. 6) and the connector module 300 will typically be made of the same type of molded plastic material. In accordance with this illustrative embodiment, the transceiver and connector modules 200 and 300 are configured to use four transmit fibers 201A-201D and four receive fibers 201E-201H. Thus, the transceiver module 200 has four laser diodes that generate optical data signals that are sent over the respective transmit fibers 201A-201D. Similarly, the transceiver module 200 has four photodiodes that are used to receive optical data signals transmitted over the four respective receive fibers 201E-201H. A strain relief mechanism 240 is configured to snap onto the housing of the connector module 300. The transceiver and connector modules 200 and 300 may be configured to use any number of transmit and/or receive fibers.

The connector module 300 includes an optics system 340 in which the ends of the fibers 201A-201H are secured. The optics system 340 has a housing that is preferably made of a molded plastic material of the same type as the molded plastic material of which the transceiver and connector modules 200 and 300 are made. The housing of the optics system 340 has two cone-shaped openings 341A and 341B formed therein that are shaped to receive and mate with cone-shaped protrusions on the transceiver module (not shown) in order to allow the connector module 300 having the optics system 340 attached thereto to be passively aligned with the transceiver module 200. This alignment ensures that the optics system (not shown) of the transceiver module 200 is optically aligned with the optics system 340 of the connector module 300. This alignment of the optics systems, in turn, ensures that the ends of the fibers 201A-201D receive the light generated by the respective laser diodes of the transceiver module 200 and that the photodiodes of the transceiver module 200 receive light propagating out of the ends of the respective fibers 201E-201H.

Figure 8A:
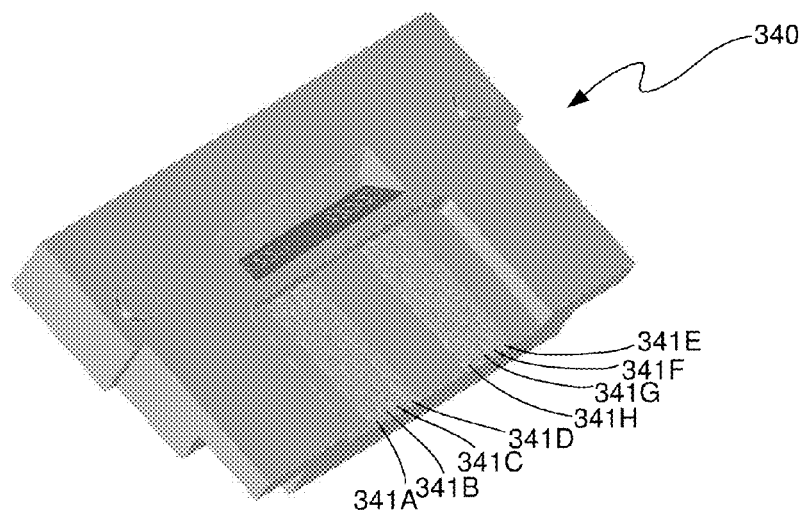
FIG. 8A illustrates a top perspective view of the optics system of the connector module shown in FIG. 6 before the ends of the fibers have been secured within the optics system.

FIG. 8A illustrates a top perspective view of the optics system 340 of the connector module 300 before the ends of the fibers 201A-201H have been secured within the optics system 340. Prior to the fibers 201A-201H being secured within the optics system 240, the end portions of the fibers to be secured within the optics system 340 are stripped of the fiber jackets that surround the fiber claddings so that all that remains at the end portions of the fibers are the fiber cores surrounded by their respective claddings. The very ends of the fibers 201A-201H are cleaved and the end portions are placed in respective V-grooves 341A-341H formed in the optics system 340.

Figure 8B:
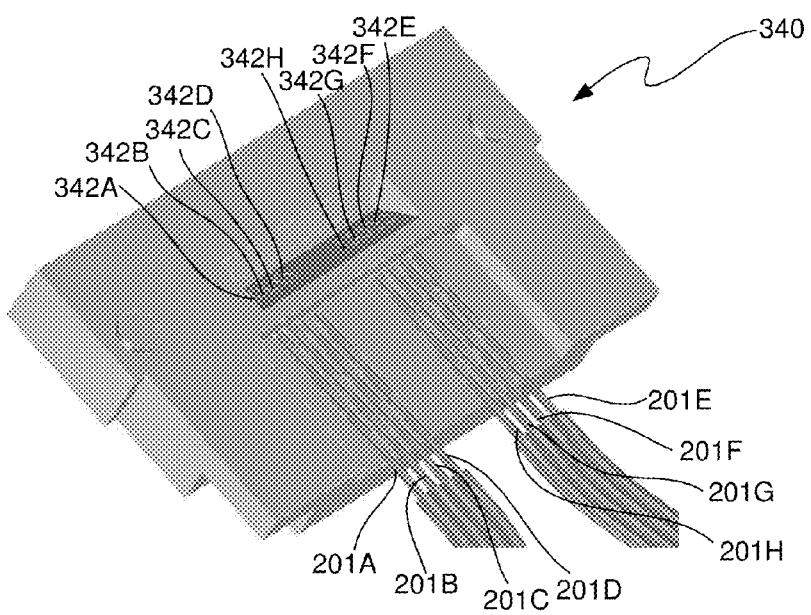
FIG. 8B illustrates a top perspective view of the optics system of the connector module shown in FIG. 6 after the ends of the fibers have been secured within the optics system.

FIG. 8B illustrates a top perspective view of the optics system 340 of the connector module 200 after the ends of the fibers 301A-301H have been secured within the optics system 340. Lenses 342A-342D focus light from received from the laser diodes of the transceiver module 200 into the respective ends of the transmit fibers 201A-201D. Lenses 342E-342H focus light propagating out of the ends of the receive fibers 201E-201H onto the respective photodiodes of the transceiver module 200.

Figure 8C:
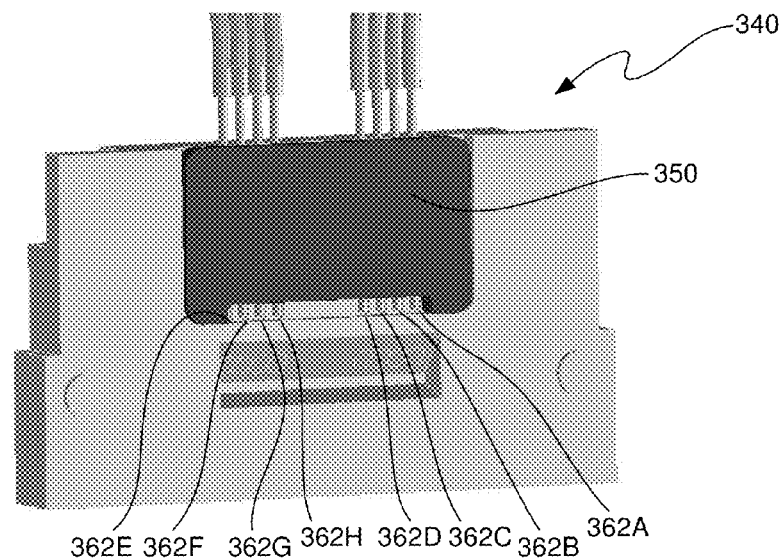
FIG. 8C illustrates a front perspective view of the optics system of the connector module shown in FIG. 6 having the ends of the fibers secured therein by a cover that has crushing features that partially crush the end portions of the fibers when the cover is snapped onto the body of the optics system.

FIG. 8C illustrates a front perspective view of the optics system 340 of the connector module 300 having the ends of the fibers 201A-201H secured therein by a cover 350 that has crushing features (not shown) that partially crush the end portions of the fibers 201A-201H when the cover 350 is snapped onto the body of the optics system 340. These crushing features ensure that the end portions of the fibers 201A-201H are tightly gripped in the V-grooves 341A-341H and do not move after the cover 350 has been installed.

Figure 8D:
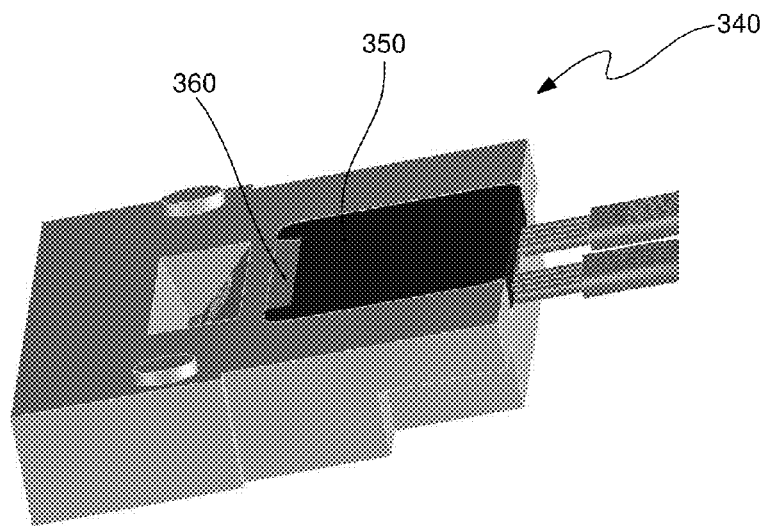
FIG. 8D illustrates a side perspective view of the optics system of the connector module shown in FIG. 6 having the ends of the fibers secured between the cover and the V-grooves and having an index-matching epoxy dispensed over the ends of the fibers.

FIG. 8D illustrates a side perspective view of the optics system 340 of the connector module 300 having the ends of the fibers 201A-201H secured between the cover 350 and the V-grooves 341A-341H and having an index-matching epoxy 360 dispensed over the ends of the fibers 201A-201H. The index-matching epoxy 360 bonds the end portions of the fibers 201A-201H to the cover and provides optical coupling between the ends of the fibers 201A-201H and respective openings 362A-362H formed in of the optics system 340 for coupling light from the lenses 342A-342D onto the ends of the fibers 201A-201D and for coupling light from the ends of fibers 201E-201H onto the lenses 342E-342H. By cleaving the ends of the fibers 201A-201H and using the index-matching epoxy to provide optical coupling, the potential for misalignment to occur as a result of temperature changes is eliminated, or at least greatly reduced, due to the fact that the fibers 201A-201H and the optics system 340 are made of materials that have the same, or at least substantially the same, coefficients of expansion.

Figure 9:
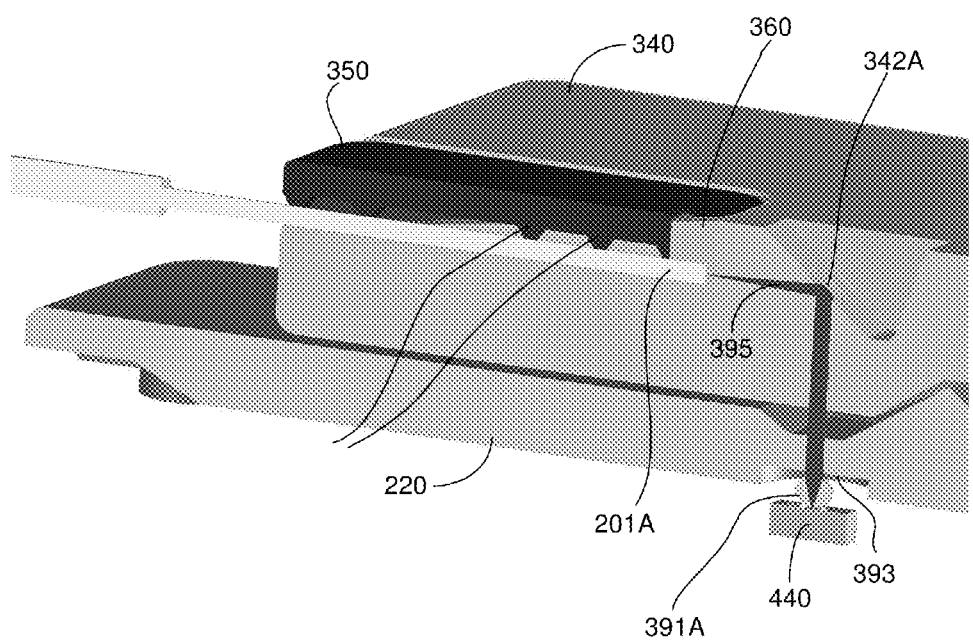
FIG. 9 illustrates a cross-sectional right side perspective view of the transceiver module shown in FIG. 6 in locking engagement with the connector module shown in FIG. 6, which shows the optical coupling provided by the optics system of the transceiver module and the optics system of the connector module on the transmit side of the transceiver module.

FIG. 9 illustrates a cross-sectional right side perspective view of the transceiver module 200 in locking engagement with the connector module 300, which shows the optical coupling provided by the optics system 220 of the transceiver module 200 and the optics system 340 of the connector module 300 on the transmit side of the transceiver module 200 for a single transmit fiber 201A. The light 395 generated by one of the laser diodes of the laser diode array 440 is collimated by the big-eye lens 391A onto the grating element 393, which directs most of the light onto the focusing lens 342A. The grating element 393 directs some small portion of the light onto monitor photo diodes (not shown) that are used in a power control feedback loop to control the average output power levels of the laser diodes of the arrays 440. Lens 342A focuses the light 395 onto the end of the optical fiber 201A.

As stated above with reference to FIG. 8D, the index-matching epoxy or gel 360 provides refractive index matching between the ends of the fibers 201A-201H and the lenses 342A-342H of the connector module 300. The lenses 342A-342H focus the light to respective focus points that are much smaller than the diameters of the ends of the respective fibers 201A-201H. Therefore, some relative movement between the lenses 342A-342H and the ends of the fibers 201A-201H can occur due to, for example, thermal expansion without causing the focal points of the lenses 342A-342H not to be on the ends of the fibers 201A-201H. In addition, the collimated light beams produced by the big eye lenses 391A-391H are significantly smaller in diameter than the diameters of the focusing lenses 342A-342H, which means that the collimated beams can move small amounts and still be fully received by the respective lenses 342A-342H and therefore remain focused on the fiber ends. This feature of the invention allows elements to move due to, for example, the coefficients of thermal expansion (CTE) for the materials of which the various elements are made being mismatched without resulting in degradation in signal integrity.

Figure 10:
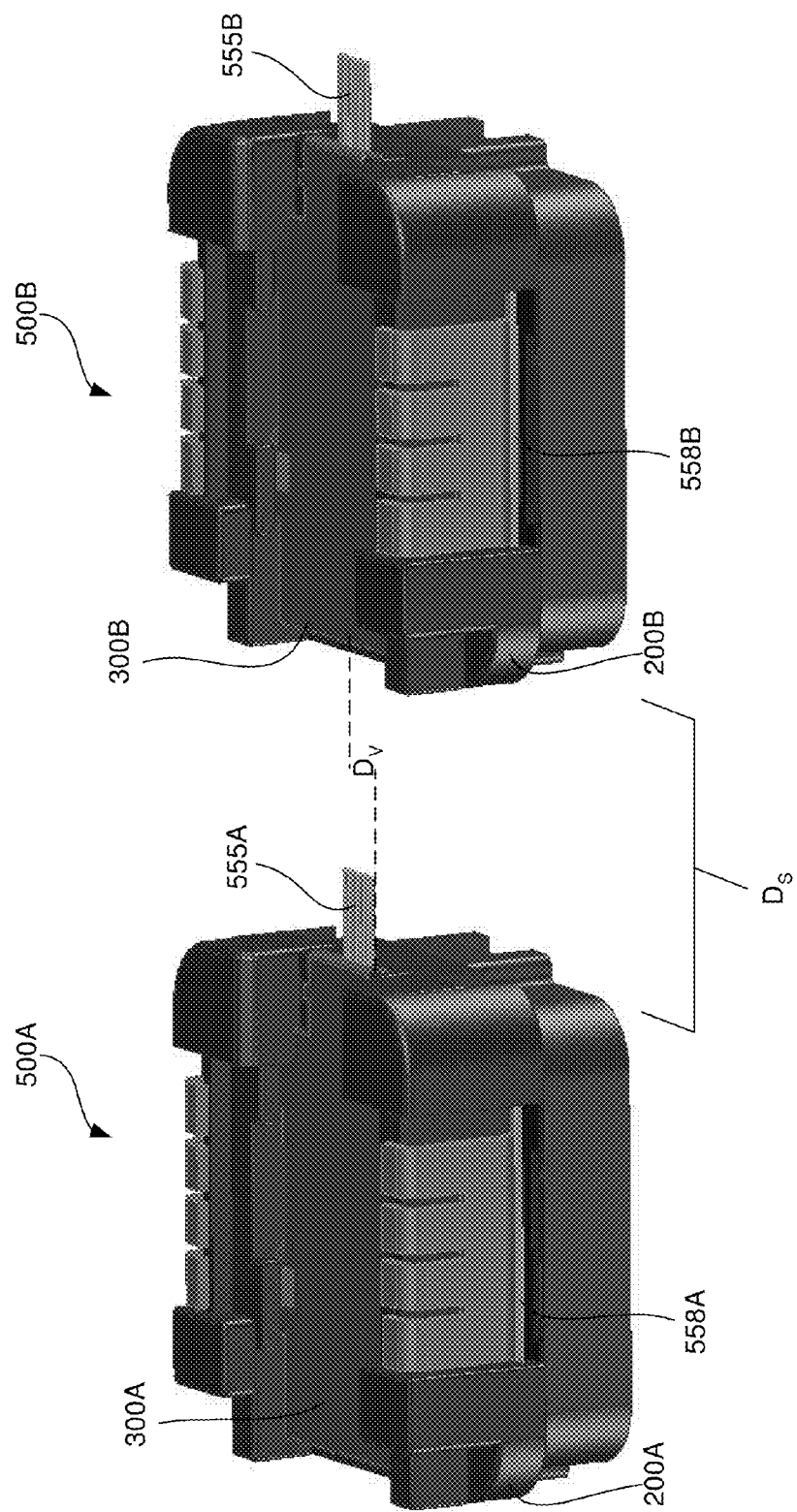
FIG. 10 illustrates a side perspective view of two of the parallel optical transceiver modules and their respective connector modules shown in FIG. 6.

FIG. 10 illustrates a side perspective view of two of the parallel optical transceiver modules 200 and their respective connectors 300 shown in FIG. 6. The transceiver modules 200 and their respective connectors 300 are labeled 500A and 500B in FIG. 10. The modules 500A and 500B are shown arranged as they would be on a motherboard PCB such as the motherboard PCB 10 shown in FIG. 1. The motherboard PCB is not shown in FIG. 10 for ease of illustration. From the side perspective view shown in FIG. 10, it can be seen that unlike the fiber ribbon cables 55 shown in FIG. 2, the fiber ribbon cables 555A and 555B do not pass over the edges of their respective modules 500A and 500B at angles to the upper surfaces of the PCBs 558A and 558B, respectively. Therefore, some minimum spacing distance, $D_S$, is needed between the modules 500A and 500B to prevent having to bend the cables beyond their minimum bend radiuses of approximately 2 inches, or 50 millimeters (mm).

However, because the connector module 300A connected on the top of the transceiver module 200A, the cable 555A exits the connector module 300A close to the top of the module 500A. The cable 555A only passes over the top of the connector module 300B of the module 500B. The vertical distance, $D_V$, between the location at which the cable 555A exits the connector module 300A and the top of the connector module 300B is extremely small. The height of the modules 500A and 500B is only about 7 mm, so the modules 500A and 500B have very low profiles. Therefore, only a very slight bend in the ribbon cable 555A is needed to enable it to pass over the top of the connector module 300B. Assuming, for example, that the minimum allowable or recommended bend radius of the cable 555A is 50 mm, then the minimum spacing distance, $D_S$, is 10 mm, or about 0.4 inches.

Therefore, depending on whether a module having a configuration of the type shown in FIG. 2 or a module having a configuration of the type shown in FIG. 6 is used, the spacing distance $D_S$ between adjacent modules ranges from 0 (i.e., in abutment) mm to about 15 mm. This is a much smaller spacing distance than that which is required in known mid-plane mount configurations in which the ribbon cables exit the back side of the modules. Although it is known to have mid-plane mounting solutions where the ribbon cables exit from the tops of the modules to enable the modules to be placed in abutment or close proximity to one another, such solutions cause the system housing to be large in the vertical, or height, dimension because there must be enough vertical space to provide a gradual bend in the cable to point it toward the front panel without bending it beyond the minimum allowable bend radius. Bending the cable beyond its minimum allowable bend radius will result in signal loss, and therefore care must be taken to ensure that this does not happen.

In contrast, both of the illustrative embodiments of the modules shown in FIGS. 2 and 6 enable the ribbon cable to exit from the back side of the module toward the panel so that the overall height, or profile, of the system can be kept relatively small. In addition, the low profiles of the modules and/or the departure angles of the ribbon cables ensure that high mounting density is achievable while also ensuring that the cables are not bent beyond their minimum allowable or recommended bend radiuses. With the module 20A shown in FIG. 3, the connector module 50A and the optics system 40A are designed to mechanically couple to each other at an angle to the upper surface of the module PCB 30A, which creates the departure angle for the ribbon cable 55A. With the module 500A shown in FIG. 10, the departure angle is generally 0°, but because the connector module 300A has an extremely low profile and connects to the top of the transceiver module 200A, the cable 555A passes over the module 500B without having to be bent significantly. This allows the modules 500A and 500B to be separated by only a very small distance, $D_S$.

It should be noted that the invention has been described with respect to illustrative embodiments for the purpose of describing the principles and concepts of the invention. The invention is not limited to these embodiments. For example, while the invention has been described with reference to using particular configurations for the parallel optical transceiver modules and the optical communications systems in which they are used, the invention is not limited to these modules and systems that have these particular configurations. As will be understood by those skilled in the art in view of the description being provided herein, modifications may be made to the embodiments described to provide a system that achieves the goal of the invention, and all such modifications are within the scope of the invention.

What is claimed is:

1. An optical communications system comprising:
a motherboard comprising a substrate having an upper surface and a lower surface, the upper surface having at least two arrays of electrical contact pads disposed thereon, the substrate having electrical conductors extending through the substrate;
at least two Meg-Array connector assemblies, each Meg-Array assembly comprising a Meg-Array receptacle and a Meg-Array plug that are mechanically and electrically coupled together, the lower and upper surfaces of the receptacle and the plug, respectively, having respective ball grid array (BGAs) thereon, wherein the Meg-Array connector assemblies are mounted on the upper surface of the motherboard such that the arrays of electrical contact pads on the upper surface of the motherboard are in electrical contact with the respective BGAs of the respective receptacles; and
at least first and second parallel optical communications modules (POCMs), each POCM having at least a front side, a back side, a bottom side, and a top side, the POCMs being mounted on the upper surfaces of respective ones of the Meg-Array plugs such that the back side of the first POCM is in contact with or in close proximity to the front side of the second POCM with a spacing distance, $D_S$, between the back side and front side of the first and second POCMs, respectively, that is equal to or greater than 0 millimeters (mm) and less than or equal to about 15 mm, and wherein each POCM is connected to a proximal end of a respective optical fiber ribbon cable in such a way that the respective cables exit the respective back sides of the respective POCMs.

2. The optical communications system of claim 1, wherein each POCM comprises:
a module circuit board (MCB) having an array of an array of active optical devices and at least one integrated circuit (IC) mounted on an upper surface thereof and an array of electrical contact pads disposed on a lower surface thereof, the array of electrical contact pads disposed on the lower surface of the MCB being in electrical contact with the BGA of the plug on which the respective POCM is mounted;
an optics system having an array of optical elements;
a connector module mechanically coupled to the optics system, the connector module holding the proximal end of the respective optical fiber ribbon cable, the optics system coupling light between ends of respective ones of the optical fibers of the respective ribbon cable and respective ones of the active optical devices.

3. The optical communications system of claim 2, wherein the connector module mechanically couples to the optics system at a coupling angle to the upper surface of the MCB of the respective POCM, and wherein the coupling angle causes the respective ribbon cable to exit the respective POCM at a departure angle to the upper surface of the MCB of the respective POCM, wherein the departure angle is greater than 0 degrees.

4. The optical communications system of claim 3, wherein the departure angle ranges from approximately 5 degrees to approximately 30 degrees.

5. The optical communications system of claim 3, wherein the spacing distance $D_S$ is approximately 0 mm.

6. The optical communications system of claim 2, wherein the connector module mechanically couples to the optics system at the top side of the respective POCM, and wherein the spacing distance $D_S$ is greater than or equal to about 10 mm and less than or equal to about 15 mm.

7. The optical communications system of claim 2, wherein the array of active optical devices of the first POCM includes N laser diodes, where N is a positive integer that is greater than 1, and wherein the array of active optical devices of the second POCM includes M photodiodes, where M is a positive integer that is greater than 1, and wherein the ribbon cable that is connected to the first POCM includes N optical transmit fibers, and wherein the ribbon cable that is connected to the second POCM includes M optical receive fibers.

8. The optical communications system of claim 2, wherein the array of active optical devices of the first POCM includes N laser diodes, where N is a positive integer that is greater than 1, and wherein the array of active optical devices of the second POCM includes M laser diodes, where M is a positive integer that is greater than 1, and wherein the ribbon cable that is connected to the first POCM includes N transmit optical fibers, and wherein the ribbon cable that is connected to the second POCM includes M optical transmit fibers.

9. The optical communications system of claim 2, wherein the array of active optical devices of the first POCM includes N photodiodes, where N is a positive integer that is greater than 1, and wherein the array of active optical devices of the second POCM includes M photodiodes, where M is a positive integer that is greater than 1, and wherein the ribbon cable that is connected to the first POCM includes N optical receive fibers, and wherein the ribbon cable that is connected to the second POCM includes M optical receive fibers.

10. The optical communications system of claim 1, further comprising:
   at least first and second hub ICs mounted on the upper surface of the motherboard, wherein the first POCM is electrically connected to the first hub IC by one or more of the electrical conductors that extend through the motherboard substrate, and wherein the second POCM is electrically connected to the second hub IC by one or more of the electrical conductors that extend through the motherboard substrate.

11. An optical communications system comprising:
   a motherboard comprising a substrate having an upper surface and a lower surface, the upper surface having at least two arrays of electrical contact pads disposed thereon, the substrate having electrical conductors extending through the substrate;
   at least first and second hub integrated circuits (ICs) mounted on the upper surface of the motherboard and electrically connected to one or more of the electrical conductors that extend through the motherboard substrate;
   at least X Meg-Array connector assemblies, each Meg-Array assembly comprising a Meg-Array receptacle and a Meg-Array plug that are mechanically and electrically coupled to each other, where X is an integer that is equal to or greater than 48, the lower and upper surfaces of the receptacle and the plug, respectively, having respective ball grid array (BGAs) thereon, wherein the Meg-Array connector assemblies are mounted on the upper surface of the motherboard such that the arrays of electrical contact pads on the upper surface of the motherboard are in electrical contact with the respective BGAs of the respective receptacles; and
   at least X parallel optical communications modules (POCMs), each POCM having at least a front side, a back side, a bottom side, and a top side, the POCMs being mounted on the upper surfaces of respective ones of the Meg-Array plugs, the POCMs and the respective plugs on which the POCMs are mounted being arranged on the upper surface of the motherboard in groups with each group comprising at least a front POCM and a back POCM, and wherein the back side of the front POCM of each respective group is in contact with or in close proximity to the front side of the back POCM of the same respective group such that the back side of the front POCM of each respective group is spaced a spacing distance, $D_S$, from the front side of the back POCM of the same respective group, wherein $D_S$ is equal to or greater than 0 millimeters (mm) and less than or equal to about 15 mm, and wherein each POCM is connected to a proximal end of a respective optical fiber ribbon cable in such a way that the respective cables exit the respective POCMs from the back sides of the respective POCMs.

12. The optical communications system of claim 1, wherein each POCM comprises:
   a module circuit board (MCB) having an array of an array of active optical devices and at least one IC mounted on an upper surface thereof and an array of electrical contact pads disposed on a lower surface thereof, the array of electrical contact pads disposed on the lower surface of the MCB being in electrical contact with the BGA of the plug on which the respective POCM is mounted;
   an optics system having an array of optical elements;
   a connector module mechanically coupled to the optics system, the connector module holding the proximal end of the respective optical fiber ribbon cable, the optics system coupling light between ends of respective ones of the optical fibers of the respective ribbon cable and respective ones of the active optical devices.

13. The optical communications system of claim 12, wherein the connector module mechanically couples to the optics system at a coupling angle to the upper surface of the MCB of the respective POCM, and wherein the coupling angle causes the respective ribbon cable to exit the respective POCM at a departure angle to the upper surface of the MCB of the respective POCM, wherein the departure angle is greater than 0 degrees.

14. The optical communications system of claim 13, wherein the departure angle ranges from approximately 5 degrees to approximately 30 degrees.

15. The optical communications system of claim 13, wherein the spacing distance $D_S$ is approximately 0 mm.

16. The optical communications system of claim 12, wherein the connector module mechanically couples to the optics system at the top side of the respective POCM, and wherein the spacing distance DS is greater than or equal to about 10 mm and less than or equal to about 15 mm.

17. The optical communications system of claim 12, wherein the array of active optical devices of the first POCM includes N laser diodes, where N is a positive integer that is greater than 1, and wherein the array of active optical devices of the second POCM includes M photodiodes, where M is a positive integer that is greater than 1, and wherein the ribbon cable that is connected to the first POCM includes N optical transmit fibers, and wherein the ribbon cable that is connected to the second POCM includes M optical receive fibers.

18. The optical communications system of claim 12, wherein the array of active optical devices of the first POCM includes N laser diodes, where N is a positive integer that is greater than 1, and wherein the array of active optical devices of the second POCM includes M laser diodes, where M is a positive integer that is greater than 1, and wherein the ribbon cable that is connected to the first POCM includes N transmit optical fibers, and wherein the ribbon cable that is connected to the second POCM includes M optical transmit fibers.

19. The optical communications system of claim 12, wherein the array of active optical devices of the first POCM includes N photodiodes, where N is a positive integer that is greater than 1, and wherein the array of active optical devices of the second POCM includes M photodiodes, where M is a positive integer that is greater than 1, and wherein the ribbon cable that is connected to the first POCM includes N optical receive fibers, and wherein the ribbon cable that is connected to the second POCM includes M optical receive fibers.

20. A method for performing parallel optical communications in an optical communications system, the method comprising:

providing a motherboard comprising a substrate having an upper surface and a lower surface, the upper surface having at least X arrays of electrical contact pads disposed thereon, where X is a positive integer that is equal to or greater than 2, the substrate having electrical conductors extending through the substrate, the upper surface of the motherboard having at least first and second hub integrated circuits (ICs) mounted thereon, the hub ICs being electrically connected to one or more of the electrical conductors that extend through the motherboard substrate, the upper surface of the motherboard having X Meg-Array receptacles mounted thereon, each Meg-Array receptacle having a ball grid array (BGA) thereon that is in electrical contact with a respective one of the arrays of electrical contact pads disposed on the upper surface of the motherboard; and providing X Meg-Array plugs having X parallel optical communications modules (POCMs) mounted thereon, respectively, each POCM having at least a front side, a back side, a bottom side, and a top side, the POCMs and the respective plugs on which the POCMs are mounted being arranged on the upper surface of the motherboard in groups with each group comprising at least a front POCM and a back POCM, and wherein the back side of the front POCM of each respective group is in contact with or in close proximity to the front side of the back POCM of the same respective group such that the back side of the front POCM of each respective group is spaced a spacing distance, $D_S$, from the front side of the back POCM of the same respective group, wherein $D_S$ is equal to or greater than 0 millimeters (mm) and less than or equal to about 15 mm, and wherein each POCM is connected to a proximal end of a respective optical fiber ribbon cable in such a way that the respective cables exit the respective POCMs from the back sides of the respective POCMs.

\* \* \* \* \*